United States Patent Office 3,473,981
Patented Oct. 21, 1969

3,473,981
GAS GENERATING COMPOSITION
CONTAINING MELAMINE
Philip G. Butts, Redlands, Calif., assignor to Olin Mathieson Chemical Corporation, a corporation of Virginia
No Drawing. Filed Apr. 15, 1966, Ser. No. 542,740
Int. Cl. C06b 1/04, 19/00
U.S. Cl. 149—19                 8 Claims

ABSTRACT OF THE DISCLOSURE

A consolidated gas-generating composition comprising a major portion of ammonium nitrate in intimate mixture with a rubber binder and between about 4% and about 8% by weight melamine. The melamine acts as a coolant to reduce the flame temperature of the gas-generating composition, with relatively little effect upon the temperature coefficient.

---

This invention relates to combustible explosive charges and more particularly to ammonium nitrate gas-generating compositions containing melamine as a coolant.

Gas-generating charges are normally used for the actuation of pressure operated mechanical devices of various types, including rockets. Ammonium nitrate compositions have been used quite extensively for this purpose and the ammonium nitrate in most cases is provided with various types of modifiers in efforts to enhance its utility for the operation of various types of gas-generator mechanisms. One problem encountered with the ammonium nitrate compositions is the relatively high flame temperatures. Although various coolants such as ammonium oxalate, ammonium nitrate, oxalic acid, and oxamide, have been used in the past to successfully reduce the flame temperature, such coolants tended to adversely affect the temperature coefficient.

It is, therefore, an object of this invention to provide a gas-generating composition having a relatively low flame temperature and a relatively low temperature coefficient.

It is a further object of this invention to provide a new and novel ammonium nitrate gas-generating composition.

More particularly, it is an object of this invention to provide an ammonium nitrate gas-generating composition incorporating melamine as a coolant.

In accordance with this invention these and other purposes are achieved by providing a consolidated gas-generating charge containing ammonium nitrate in intimate mixture with a rubber binder, a ballistic modifier, and melamine.

This invention also contemplates such compositions containing carbon black and an ammonium nitrate decomposition catalyst such as sodium barbiturate.

More specifically this invention contemplates such a gas-generating charge containing between about 65% and about 80% by weight ammonium nitrate, between about 12% and about 18% by weight binder, between about 2% and about 10% ballistic modifier, and between about 4% and about 8% melamine. The composition may also contain between about 1% and 3% sodium barbiturate and between about 1% and about 3% carbon black.

In accordance with the preferred embodiment of this invention, the binder consists of an acrylic acid modified polybutadiene rubber. However, other rubbers having like binding properties may be used such as butadiene copolymerized with one or more monomers such as acrylonitrile, styrene and vinyl pyridine. Synthetic rubbers based on isobutylene and similar unsaturated hydrocarbons polymerizable to products of a rubber material can likewise be employed.

The ballistic modifiers used in the present gas-generated compositions are explosive compounds or compositions designed to control the burning rate and to enhance ignitability of the composition. Suitable ballistic modifiers include guanidine nitrate, nitroguanidine, cyclotrimethylenetrinitramine, 2,4-dinitrophenoxyethanol, and the like.

Sodium barbiturate serves as a decomposition catalyst for the ammonium nitrate. Compositions containing less than 1% of this material do not give reliable results whereas increasing the percentage of sodium barbiturate above about 3% yields no additional advantages. In fact, if this material were present in proportions greater than 3%, the excess portion would not serve any useful purpose but would merely act as a diluent. While the properties of the decomposition catalyst are improved by small percentages of carbon black, amounts of this material in excess of 3% serve no useful purpose.

The melamine should be present in the composition from about 4.0% to about 8.0% by weight. Larger proportions of melamine would seriously impair the ignitability of the material and amounts less than 4% would have little or no effect upon the flame temperature.

The compositions prepared in accordance with this invention are in compact form. The rubber binder is added to a sigma blade mixer together with a suitable solvent such as hexane which assists in incorporating the other solid ingredients in the binder in accordance with the conventional solvent mixing technique. Other solvents suitable for this purpose include heptane, cyclohexane, benzene, petroleum ether, and the like.

Concurrently, increments of the oxidizer and other solids including the melamine are added to the mixer along with the binder and hexane. After all the ingredients are added to the mixer, the batch is mixed sufficiently to completely incorporate the oxidizers, modifiers, melamine, and other solids into the rubber binder.

Upon completion of the mixing, vacuum is applied to remove the solvent. Stirring is continued during this period until the volatile solvent is completely removed. This final mixing stage is normally completed within one hour after which the propellant is removed from the mixer and transferred to the compression molding or extrusion equipment. Depending upon the particular composition and the desired density of the finished product, pressures up to 5000 p.s.i. and temperatures up to 180° F. can be conveniently used in molding the composition.

Table I shows the weight percentages of the various ingredients making up the total composition of several examples prepared in accordance with the above-described process. Examples I, III, and IV are in accordance with the present invention and contain melamine. Examples II and IV are included for comparative purposes and contain ammonium oxalate in place of the melamine.

TABLE I

| Composition | Weight Percent | | | | |
|---|---|---|---|---|---|
| | I | II | III | IV | V |
| Ammonium nitrate | 74.0 | 74.0 | 74.0 | 74.0 | 68.0 |
| PBAA rubber [1] | 14.0 | 14.0 | 14.0 | 14.0 | 14.0 |
| Guanidine nitrate | 4.0 | 4.0 | 6.0 | 6.0 | 7.5 |
| Carbon black | 2.0 | 2.0 | | | 2.0 |
| Sodium barbiturate | 2.0 | 2.0 | | | 2.0 |
| Ammonium oxalate | | 4.0 | | 6.0 | |
| Melamine | 4.0 | | 6.0 | | 6.5 |

[1] Polybutadiene acrylic acid rubber.

Table II shows various propellant properties of the examples of Table I. By comparing the properties of Example I with Example II and Example III with Example IV, it is seen that melamine is as effective as ammonium oxalate in reducing the flame temperature and that melamine results in a significantly lower temperature coefficient as compared with ammonium oxalate.

TABLE II

| Propellant Property | Composition from Table I | | | | |
| --- | --- | --- | --- | --- | --- |
| | I | II | III | IV | V |
| Calculated flame temperature (° F.) | 1,940 | 1,929 | 2,050 | 2,960 | 1,785 |
| Temperature coefficient (percent/° F.) | 0.23 | 0.28 | 0.30 | 0.38 | 0.25 |
| Burning rate in./sec. at 1,000 p.s.i., 80° F | .077 | 0.081 | 0.68 | 0.60 | 0.086 |
| Isp (sec.) | 182.7 | 182.9 | | | |

It is to be understood that the above examples have been included for illustrative purposes only and that the percentage of each of the various ingredients may be varied within the general ranges set forth in this specification. In addition, the propellant grains produced in accordance with this invention may be provided with various types of suface inhibitors or coatings to control their burning rate, ignitability, or other characteristics. It is, therefore, intended that the scope of this invention be ascertained by reference to the following claims.

What is claimed is:

1. A consolidated gas generating composition comprising a major proportion of ammonium nitrate in intimate mixture with a rubber binder and between about 4% and about 8% by weight melamine.

2. The composition of claim 1 wherein said ammonium nitrate comprises between about 65% and about 80% by weight, and said rubber binder comprises between about 12% and about 18% by weight.

3. The composition of claim 2 further including between about 2% and about 10% by weight ballistic modifier.

4. The composition of claim 3 wherein said ballastic modifier is selected from the group consisting of guanidine nitrate, nitroguanidine, cyclotrimethylenetrinitramine and 2,4-dinitrophenoxyethanol.

5. The composition of claim 3 further including between about 1% and about 3% by weight sodium barbiturate and between about 1% and about 3% by weight carbon black.

6. The composition of claim 5 comprising about 74% by weight ammonium nitrate, about 14% by weight binder, about 2% by weight carbon black, about 2% by weight sodium barbiturate, about 4% by weight melamine, and about 4% by weight ballistic modifier, said ballistic modifier being guanidine nitrate.

7. The composition of claim 5 comprising about 68% by weight ammonium nitrate, about 14% by weight rubber binder, about 2% by weight carbon black, about 2% by weight sodium barbiturate, about 6.5% by weight melamine, about 7.5% by weight ballistic modifier, said ballistic modifier being guanidine nitrate.

8. The gas generating composition of claim 4 comprising about 74% by weight ammonium nitrate, about 14% by weight rubber binder, about 6% by weight ballistic modifier, and about 6% by weight melamine, said ballistic modifier being guanidine nitrate.

References Cited

UNITED STATES PATENTS

| | | | |
| --- | --- | --- | --- |
| 2,995,430 | 8/1961 | Scharf | 149—19 |
| 3,002,830 | 10/1961 | Barr | 149—19 |
| 3,046,829 | 7/1962 | Roemer | 149—19 X |
| 3,123,507 | 3/1964 | Butts et al. | 149—19 |

BENJAMIN R. PADGETT, Primary Examiner

U.S. Cl. X.R.

149—88, 92